United States Patent
Conzola et al.

(10) Patent No.: US 9,501,586 B2
(45) Date of Patent: Nov. 22, 2016

(54) DISPLAYING DATA SETS ACROSS A PLURALITY OF VIEWS OF A USER INTERFACE

(71) Applicant: Lenovo Enterprise Solutions (Singapore) Pte. Ltd., Singapore (SG)

(72) Inventors: Vincent C. Conzola, Raleigh, NC (US); Keith D. Cramer, Pine Island, MN (US); Mark E. Molander, Cary, NC (US); Ryan P. Randolph, Rochester, MN (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 298 days.

(21) Appl. No.: 13/778,640

(22) Filed: Feb. 27, 2013

(65) Prior Publication Data

US 2014/0245218 A1  Aug. 28, 2014

(51) Int. Cl.
G06F 3/048 (2013.01)
G06F 17/30 (2006.01)

(52) U.S. Cl.
CPC ................ *G06F 17/30994* (2013.01)

(58) Field of Classification Search
CPC .......... G06F 8/10; G06F 8/38; G06F 11/328; G06F 17/30126; G06F 17/30867; G06F 17/30994
See application file for complete search history.

(56) References Cited

U.S. PATENT DOCUMENTS

| | | | |
|---|---|---|---|
| 5,592,609 A * | 1/1997 | Suzuki et al. | ................ 345/473 |
| 6,789,054 B1 | 9/2004 | Makhlouf | |
| 7,363,531 B2 | 4/2008 | Vecoven | |
| 7,512,894 B1 * | 3/2009 | Hintermeister et al. | ...... 715/771 |
| 7,562,306 B2 | 7/2009 | Broussard | |
| 8,060,862 B2 | 11/2011 | Eldridge et al. | |
| 2004/0267764 A1 | 12/2004 | Rothman et al. | |
| 2007/0226077 A1 * | 9/2007 | Frank et al. | ..................... 705/27 |
| 2008/0288873 A1 * | 11/2008 | McCardle et al. | ............. 715/735 |
| 2009/0215486 A1 * | 8/2009 | Batni et al. | ................. 455/550.1 |
| 2010/0017746 A1 * | 1/2010 | Husoy et al. | .................. 715/781 |
| 2010/0070909 A1 * | 3/2010 | Biltz et al. | ..................... 715/781 |
| 2011/0125829 A1 | 5/2011 | Finley et al. | |
| 2011/0126214 A1 | 5/2011 | O'Farrell et al. | |

OTHER PUBLICATIONS

Brandt et al., "Ovis-2: A Robust Distributed Architecture for Scalable RAS" IEEE International Symposium on Parallel and Distributed Processing, IPDPS 2008, Apr. 14-18, 2008 [online], [retrieved on May 4, 2012]. Retrieved from the Internet <URL: http://ieeexplore.ieee.org/stamp/stamp.jsp?tp=&arnumber=4536549>.

(Continued)

*Primary Examiner* — Namitha Pillai
(74) *Attorney, Agent, or Firm* — Zilka-Kotab, PC (57) ABSTRACT

A method for displaying attributes of a computer system. Displaying, on a user interface, a representation for each of the plurality of groups. Receiving a selection of one or more of the plurality of groups to display, based on a selection of one or more corresponding representations of the displayed representations. Displaying, in a first view on the user interface, the one or more related attributes of each of the selected one or more groups. Receiving a request to display the one or more related attributes of each of the selected one or more groups, in a second view on the user interface, wherein the second view depicts attributes in an alternative manner than the first view. Displaying, in the second view on the user interface, the one or more related attributes of each of the selected one or more groups.

15 Claims, 6 Drawing Sheets

(56) References Cited

OTHER PUBLICATIONS

Damianou et al., "Tools for Domain-based Policy Management of Distributed Systems" IEEE/IFIP Network Operations and Management Symposium (NOMS2002), Florence, Italy, Apr. 15-19, 2002, pp. 213-218 [online], [retrieved on May 3, 2012]. Retrieved from the Internet <URL: http://www.doc.ic.ac.uk/~ecl1/papers/2002nomstoolkit.pdf>.

Fossa et al., "Implementing Interactive Configuration Management for Distributed Systems" Proceedings of Third International Conference on Configurable Distributed Systems, 1996, pp. 44-51 [online], [retrieved on May 3, 2012]. Retrieved from the Internet <URL: http://ieeexplore.ieee.org/stamp/stamp.jsp?tp=&arnumber=509345>.

Mohta, "Got Huge Data in Excel ? Group Columns or Rows" Technosopt.Net Copyright 2012 [online], [retrieved on Sep. 17, 2012]. Retrieved from the Internet <URL: http://www.technospot.net/blogs/got-huge-data-in-excel-group-columns-or-rows/>.

Weber et al., "An Architecture for Multi-View Information Overlays" Australasian Symposium on Information Visualisation, Christchurch, 2004, Australian Computer Society, Inc. [online], [retrieved on May 3, 2012]. Retrieved from the Internet <URL: http://citeseerx.ist.psu.edu/viewdoc/download?doi=10.1.1.87.8020&rep=rep1&type=pdf>.

* cited by examiner

DISPLAYING DATA SETS ACROSS A PLURALITY OF VIEWS OF A USER INTERFACE

FIELD OF THE INVENTION

The present invention relates generally to the field of displaying data sets, and more particularly displaying data sets across a plurality of user interface views.

BACKGROUND OF THE INVENTION

Presently, there are various types of content manager programs which have the ability to display various views of data sets on a user interface of a single program. A content manager program is an example of such a program that can integrate physical and virtual computation, storage, and networking resources into a single program with a single user interface. A user has the ability to select various views of the content manager program so the view can be displayed on the user interface based on preference. The content manager programs can collect, store, and present data to a user in an organized manner. However, due to the copious amount of data that can be collected, there is a limit on how much of that data can be presented to the user on the user interface. Typically, the user has to search through a list of data and select the data which is to be evaluated through the different views of the content manager program. The user interface of the content manager program is not readily able to display all of the data when switching between views of the content manager program, thus requiring the user to search through the list of data again to find the previously selected data.

SUMMARY

Embodiments of the present invention disclose a method, computer program product, and computer system for displaying attributes of a computer system. The computer creates a plurality of groups, from a plurality of attributes of a computer system, wherein each of the plurality of groups consists of one or more related attributes. The computer displays, on a user interface, a representation for each of the plurality of groups. The computer receives a selection of one or more of the plurality of groups to display, based on a selection of one or more corresponding representations of the displayed representations. The computer displays, in a first view on the user interface, the one or more related attributes of each of the selected one or more groups. The computer receives a request to display the one or more related attributes of each of the selected one or more groups, in a second view on the user interface, wherein the second view depicts attributes in an alternative manner than the first view. The computer displays, in the second view on the user interface, the one or more related attributes of each of the selected one or more groups.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures.

Figure 1:
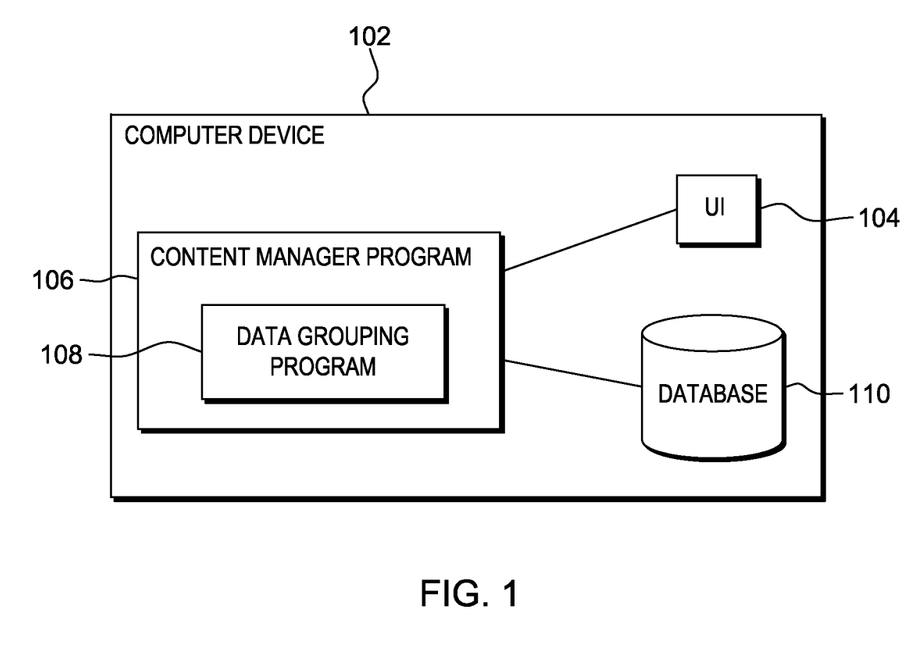
FIG. 1 is a functional block diagram illustrating a data processing system, in accordance with an embodiment of the present invention.

FIG. 1 is a functional block diagram illustrating a data processing system, designated as computer device 102, in accordance with an embodiment of the present invention.

Computer device 102 may be a laptop computer, tablet computer, netbook computer, personal computer (PC), a desktop computer, a personal digital assistant (PDA), a smart phone, or any programmable electronic device capable of hosting multiple computer programs. Computer device 102 has user interface 104 through which information can be presented to a user. The user is presented information from content manager program 106 and data grouping program 108 through user interface 104. Content manager program 106 represents any computer program in which data content can be organized and stored. Examples of content manager program 106 can include, but are not limited to, Microsoft Excel™, IBM Flexible System Manager™, and United Systems Manager™. User interface 104 has the ability to display various views and data content of content manager program 106.

Data grouping program 108 may, in one embodiment, be a sub-program or routine of content manager program 106. Data grouping program 108 is capable of displaying data sets comprised of various data items in a plurality of views of user interface 104. A data item is an attribute providing particular information of a computer system in a quantitative or qualitative manner. The computer system described by such attributes need not necessarily be the computer system executing data grouping program 108, e.g., computer device 102, and may be a computer device, a computer network, or any collection of computers and electronic components in communication with each other. Examples of descriptive attributes provided in a data set include: temperature of various components of the system, memory usage, platform name, and CP utilization. Each data set contains a group of related attributes. For example, each individual component of a larger computer system may correspond to a data set of attributes describing the particular component. A computer system being described may comprise any number of descriptive data set groupings. Data grouping program 108 has access to database 110 in which data items and data sets can be stored. While in FIG. 1, database 110 is located separate from content manager program 106, one of skill in the art will appreciate that in other embodiments, database 110 can reside on an external storage component in communication with computer device 102.

Figure 2:
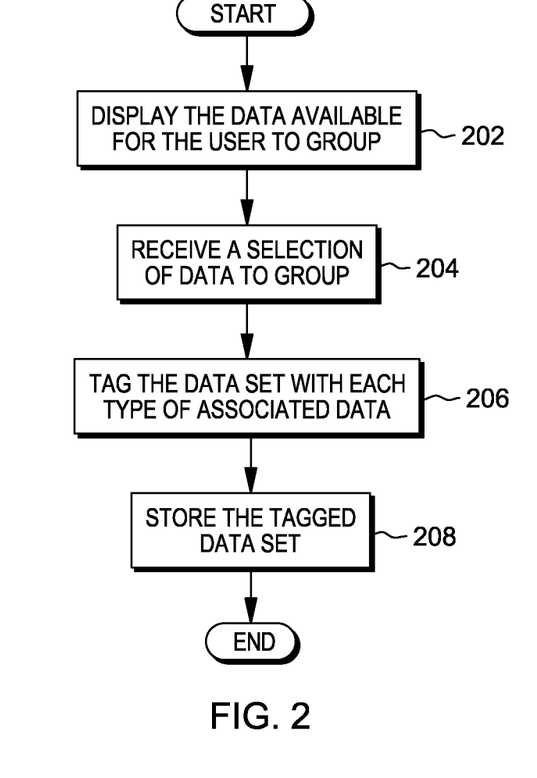
FIG. 2 is a flowchart depicting operational steps for creating a data set to be displayed in a plurality of views of a user interface within the data processing system of FIG. 1, in accordance with an embodiment of the present invention.

FIG. 2 is a flowchart depicting operational steps for grouping data items and storing the grouped data as a data set, according to an exemplary embodiment of the present invention.

In an exemplary scenario, a user may utilize content manager program 106 to compare data items among different views of user interface 104. For example, content manager program 106 can have a "Table View" where a data set has data items listed in a column and row format or a "Virtual View" where the correlating data items are associated with a component or entity of the larger computer system being described by the data items. An entity can be, for example, an internal component of a computer system, a computer device, and/or a network connection. The data items that are available for display on user interface 104 of computer device 102 may, in this scenario, exceed the visual size constraints of user interface 104. For example, all of the columns of data items cannot be visually represented since the number of columns are too large. As a result, all of the data items may not be readily displayed on user interface 104 for the user to view. When the user opens content manager program 106, there may be multiple views of user interface 104 on which the user can view data items.

The multiple views may include, but are not limited to, a table view, a hardware view, and/or a virtual aspect view. Depending on the preference of the user, the multiple views of user interface 104 can be displayed one at a time or concurrently with one another. The user can have the ability to select a single view of user interface 104 to view the data set, or the user can select two or more views of user interface 104 to be viewed at any single time. The table view can display data sets in a column and row format. For example, a single column can list data items or attributes, and a single row can represent an entity or component with which the respective data item corresponds. In such an example, each row would represent a data set corresponding to a respective component.

The hardware view, and similarly the virtual aspect view can display a data set with relation to the component to which the data set corresponds. For example, in a virtual aspect view, a server rack is visually represented with the components (i.e., servers) in their corresponding position on the server rack. The visual representation, in the virtual aspect view displays the server rack and the servers in the positions of each of the server's physical locations in the server rack. In the virtual aspect view, the user can view the corresponding data set to each server in the server rack by selecting the server through an input on user interface 104. The user can select the server and the corresponding data set to the server can appear in a separate window in user interface 104. The separate window can appear in user interface 104 as an overlay over the visual representation of the servers in the virtual aspect view. Once the user is finished viewing the corresponding data set from the previously selected server in the separate window in user interface 104, the user can select another server to view the corresponding data set or the user can close the separate window.

Referring back to FIG. 2, data grouping program 108 displays the representation of related attributes that are available for the user to group in order to create the data sets (step 202). In this embodiment, the attributes being discussed are those of a computer system. Related attributes of the computer system can be grouped together for organizational purposes. When related attributes are grouped, they can be assigned a representation for every group. An example of how the representation can be assigned is, by the user manually inputting the representation for the related attributes. In another example, the representation is automatically established based on the word or unit of measurement for each of the related attributes. A unit of measurement for temperature such as "Celsius" would imply the attribute is a temperature reading and the list of related attributes would be assigned a representation (i.e., title) "Temperature." In another example, a common subject can be drawn from the related attributes and the common subject is established as the representation of that group.

The attributes (i.e., data items) can be stored in database 110 but it is also acknowledged that the data items can be imported from any external database not located on computer device 102. In this example, the data items that are displayed in step 202 show only the visual representations (i.e., titles) of the data items available for the user to group to create a given data set. An example of a title can be "Temperature" and the related attributes would be temperature readings for the various entities being looked at by the user. In another example, a title can be "Server Name" and the related attributes would be server names for the various entities being looked at by the user. The titles with related attributes can be displayed on user interface 104 in a list format for the user to search and select the data set. It is to be noted, titles are just one example of a visual representation of related attributes.

Data grouping program 108 receives a selection of the representations with the corresponding related attributes which will comprise a data set (step 204). There can be a limit imposed on the number of data items selected to form the data set so as not to exceed visual constraints of displaying them on user interface 104. Imposing a limit on the number of data items selected to form the data set ensures user interface 104 properly displays the data set when switching between all of the possible views of content manager program 106.

Data grouping program 106 tags each attribute with the associated data set (step 206) and stores the tagged information of each attribute (step 208). Tagging each attribute with the associated data set is a way of grouping the various data items to form a data set. Each tag correlates to a connection of a single attribute with a single data set. It is to be noted, a single data item can be tagged and associated with multiple data sets. In the instance, where there are multiple data sets created by the user of content manager program 106, the user has the ability to select which data set should be displayed in user interface 104. These data sets will be able to transfer between the multiple views of content manager 106 depending on which data set the user wants to view on user interface 104.

Figure 3:
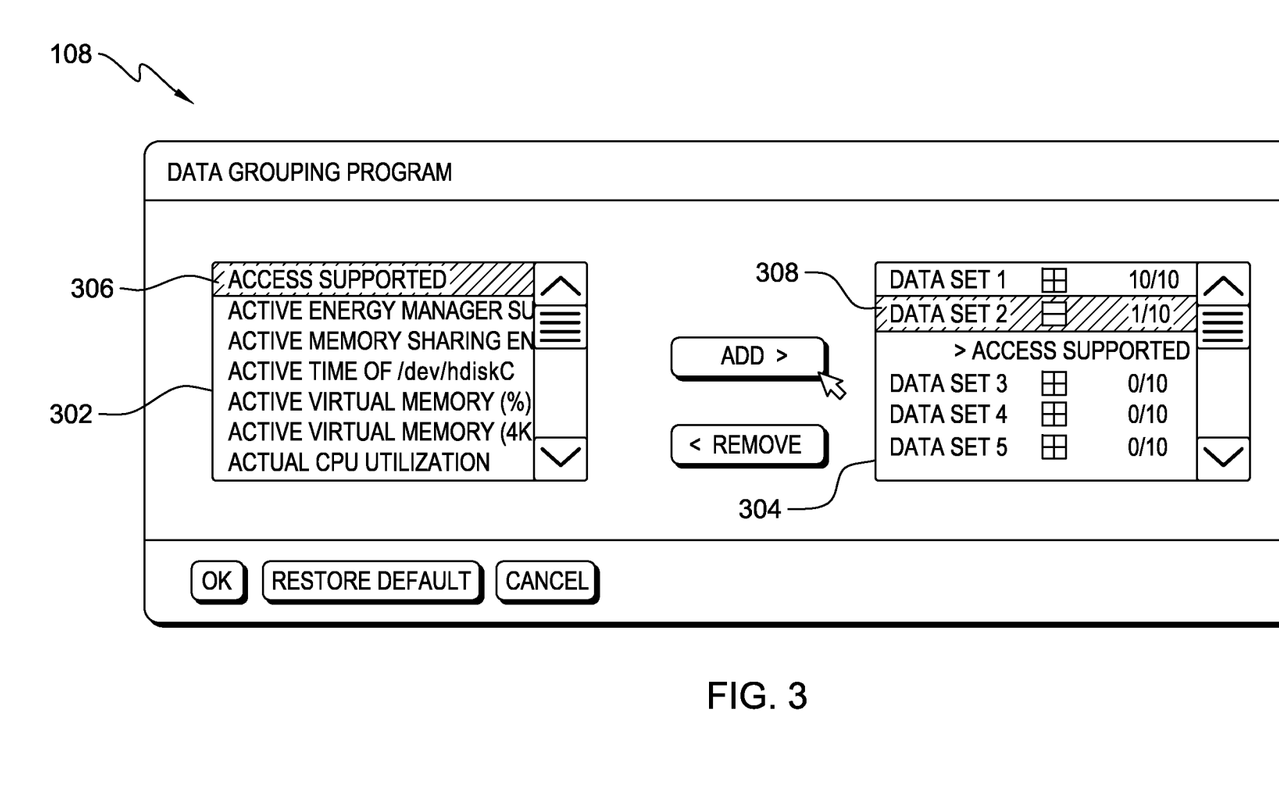
FIG. 3 illustrates the creation of the data set, on the data processing system of FIG. 1, in accordance with an embodiment of the present invention.

FIG. 3 is an example view of user interface 104 being used to select data items to create a data set using data grouping program 108, according to an exemplary embodiment of the present invention.

In an exemplary embodiment, the data items, stored in database 110 are displayed in data scroll list 302. Data scroll list 302 contains available data items a user might want to display when switching between the different views of content manager program 106 on user interface 104. Data set scroll list 304 contains all of the grouped data items according to the preference of the user. When selecting the data items to be included in a specific data set, the user selects the data item by highlighting the data item with highlight bar 306. Once highlighted, the user selects the data set to which the highlighted data will be associated. Selecting the data set is done by highlighting the data set with highlight dataset bar 308. Once both the data item and target data set are highlighted, you can assign the data item to the data set. In this embodiment, there is an indicator of how many data items you may need to complete a data set. It is to be noted that any single data item may belong to multiple data sets.

Figure 4:
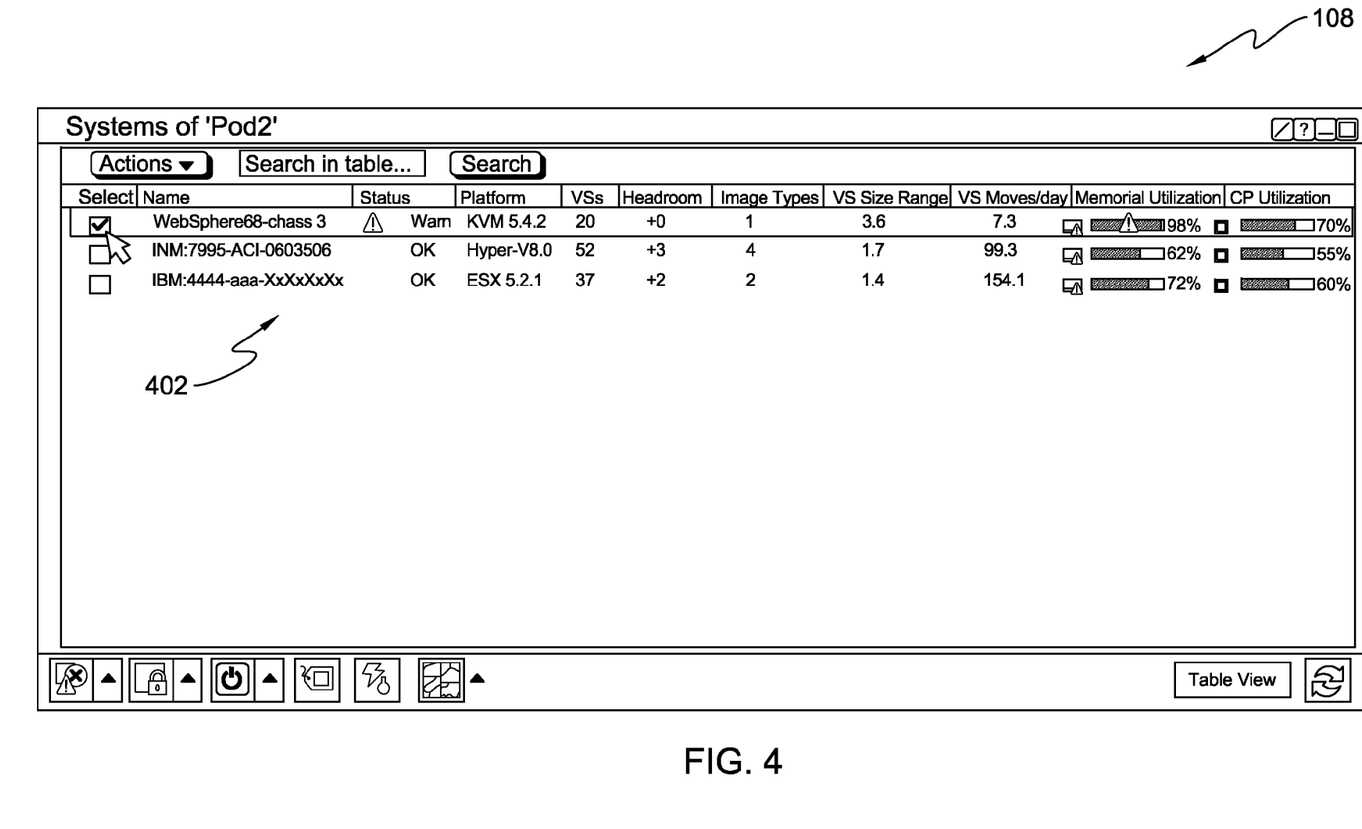
FIG. 4 illustrates displaying a data set in a first view of the user interface, in accordance with an embodiment of the present invention.

FIG. 4 is an example view of the data set being displayed in a first view on user interface 104, according to an exemplary embodiment of the present invention.

In an example, data set 402 is displayed on user interface 104 in a first view. In this example, the first view (i.e., Table View) displays all the information of the data in an organized row and column manner. The number of columns used to display the data set is within the visual constraints of user interface 104 such that the user does not need to seek for the data items of the data set. In this embodiment, the user has only one data set (i.e., data set 402) open for display on user interface 104. In another embodiment, the user can have another data set displayed along side data set 402. The number of columns displaying the data set can depend on the display size (i.e., aspect ratio) of user interface 104. The ability of having the customized data sets allows for the data items to be accessed without having to search for the data items which are being viewed on user interface 104 by the user in the different views of content manager program 106.

Figure 5:
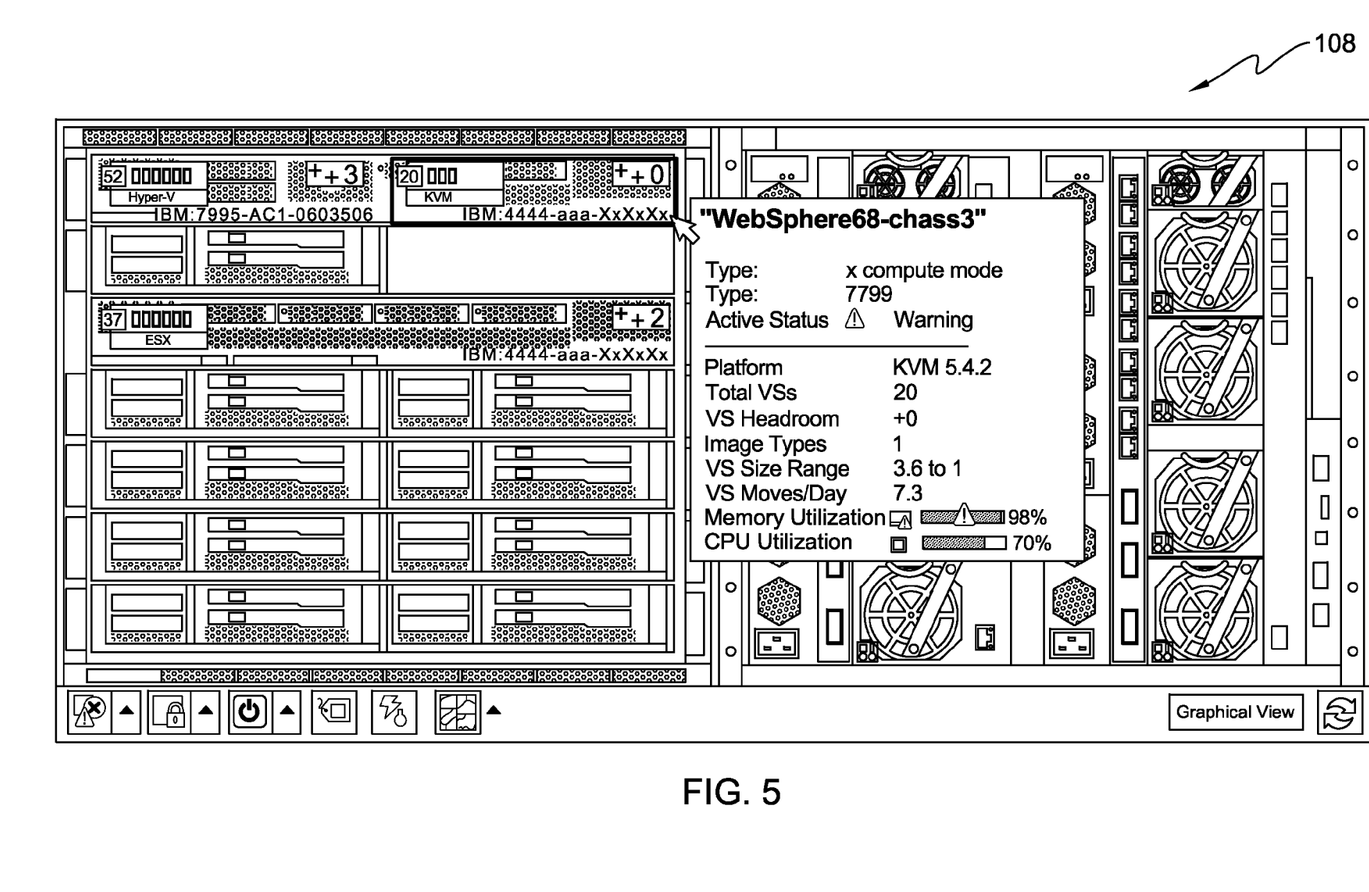
FIG. 5 illustrates displaying the data set being displayed in a second view of the user interface, in accordance with an embodiment of the present invention.

FIG. 5 is an example view of the data set of FIG. 4 being displayed in a second view on user interface 104, according to an exemplary embodiment of the present invention.

The data set displayed in the Table View of FIG. 4, can be displayed in a second view (i.e., Graphical View) as shown in FIG. 5. The Graphical View is a virtualization of the entities being viewed on user interface 104 in FIG. 4. In this example, the entities being viewed on user interface 104 are various servers in a server rack. Instead of the data set being listed in a column and row format, the data set is presented to the user in a window for the server selected by the user. The user selects the server through a user input and the corresponding data set for the selected server is displayed on user interface 104 for the user to view. The data set remains the same among the change between views of user interface 104. The user can be presented with a list of views in which the data set can be displayed and the user will have the ability to select the view of user interface 104 based on personal preference. The user has the ability to import and replace the data set with other data sets, established through the steps discussed in FIG. 2. The user can inter-change the various data sets among the various views of content manager program 106 on user interface 104. As previously mentioned the user also has the ability to display two or more data sets in a single view rather than inter-changing them. Based on preference by the user, the data sets can be displayed next to each other in a single view.

Figure 6:
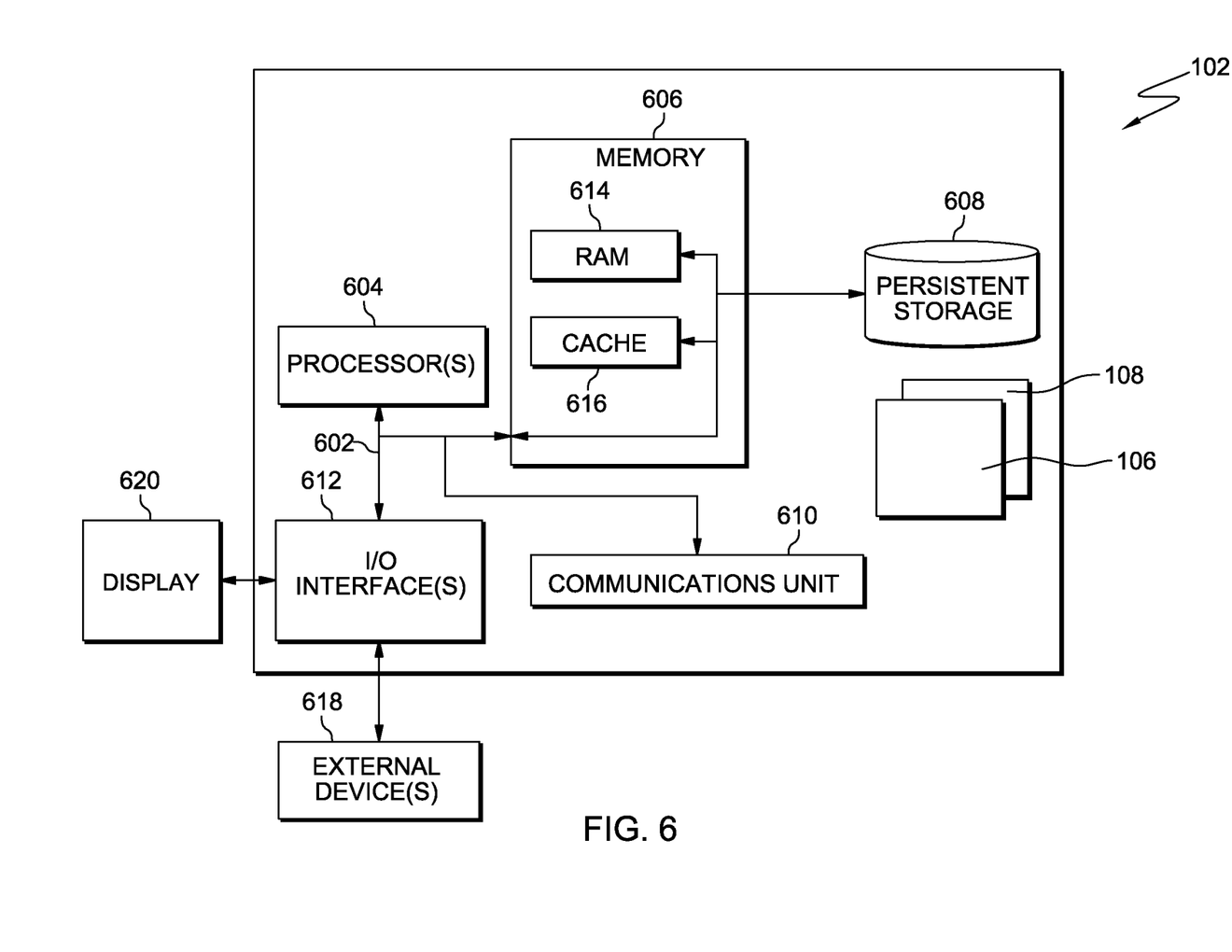
FIG. 6 depicts a block diagram of components of the data processing system, in accordance with an embodiment of the present invention.

FIG. 6 depicts a block diagram of components of computer device 102 in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Computer device 102 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 614 and cache memory 616. In general, memory 606 can include any suitable volatile or non-volatile computer-readable storage media.

Content manager program 106 and data grouping program 108 are stored in persistent storage 608 for execution by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

In these examples, communications unit 610 includes one or more network interface cards. Communications unit 610 may provide communications through the use of either or both physical and wireless communications links. Content manager program 106 and data grouping program 108 may be downloaded to persistent storage 608 through communications unit 610.

I/O interface(s) 612 allows for input and output of data with other devices that may be connected to computer device 102. For example, I/O interface 612 may provide a connection to external devices 618 such as a keyboard, keypad, a touch screen, and/or some other suitable input device. External devices 618 can also include portable computer-readable storage media such as, for example, thumb drives, portable optical or magnetic disks, and memory cards. Software and data used to practice embodiments of the present invention, e.g., content manager program 106 and data grouping program 108 can be stored on such portable computer-readable storage media and can be loaded onto persistent storage 608 via I/O interface(s) 612. I/O interface(s) 612 also connect to a display 620.

Display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for displaying attributes of a computer system, the method comprising:
creating a plurality of groups, from a plurality of attributes of a computer system, by tagging the plurality of attributes with the plurality of groups such that each attribute is associated with at least one group, and storing tag information for each of the attributes, wherein each instance of the tag information correlates to a connection of one of the attributes to one of the groups, wherein each of the plurality of groups consists of one or more related attributes, and at least one of the attributes is tagged with two or more of the groups;
displaying, during creation of the plurality of groups, an indicator of a number of the attributes required to complete a current one of the groups;
determining a descriptive title for each group of the plurality of groups, wherein the descriptive title for each group is determined based on at least one of a unit of measurement of the group of attributes, and a common subject implied by the attributes of the group;
displaying, on a user interface, the descriptive title characterizing the one or more related attributes of each respective group of the plurality of groups;
receiving a selection of one or more of the plurality of groups to display, based on a selection of one or more corresponding descriptive titles of the displayed descriptive titles;
displaying, in a first view on the user interface, the one or more related attributes of each of the selected one or more groups, the first view comprising a table view listing the attributes in a column and row format;

receiving a request to display the one or more related attributes of each of the selected one or more groups, in a second view on the user interface, wherein the second view depicts attributes in an alternative manner than the first view; and displaying, in the second view on the user interface, the one or more related attributes of each of the selected one or more groups, the second view comprising a virtual aspect view displaying the attributes with relation to components of the computer system, wherein the computer system is a server such that the virtual aspect view displays a server rack, the server in a position on the server rack, and the attributes in positions on the server, wherein each of the positions corresponds to respective physical locations in the server rack.

2. The method of claim 1, wherein the first and the second view are displayed simultaneously in the user interface.

3. The method of claim 1, wherein selection of the one or more groups to display is limited by an amount of attributes which can be simultaneously displayed in the first view on the user interface.

4. The method of claim 1, wherein the plurality of attributes are selected from a group consisting of quantitative attributes and qualitative attributes.

5. The method of claim 1, further comprising:

receiving a selection of another one or more of the plurality of groups to display, based on a selection of another one or more corresponding descriptive titles;

removing, from the first view on the user interface, the attributes of each of the selected one or more groups; and displaying, in the first view on the user interface, the attributes of each of the selected other one or more groups.

6. A computer program product for displaying attributes of a computer system, the computer program product comprising:

one or more computer-readable storage media and program instructions stored on the one or more computer-readable storage media, the program instructions comprising:

program instructions to create a plurality of groups, from a plurality of attributes of a computer system, by tagging the plurality of attributes with the plurality of groups such that each attribute is associated with at least one group, and storing tag information for each of the attributes, wherein each instance of the tag information correlates to a connection of one of the attributes to one of the groups, wherein each of the plurality of groups consists of one or more related attributes, and at least one of the attributes is tagged with two or more of the groups;

program instructions to display, during creation of the plurality of groups, an indicator of a number of the attributes required to complete a current one of the groups;

program instructions to determine a descriptive title for each group of the plurality of groups, wherein the descriptive title for each group is determined based on at least one of a unit of measurement of the group of attributes, and a common subject implied by the attributes of the group;

program instructions to display, on a user interface, the descriptive title characterizing the one or more related attributes of each respective group of the plurality of groups;

program instructions to receive a selection of one or more of the plurality of groups to display, based on a selection of one or more corresponding descriptive titles of the displayed descriptive titles;

program instructions to display, in a first view on the user interface, the one or more related attributes of each of the selected one or more groups, the first view comprising a table view listing the attributes in a column and row format;

program instructions to receive a request to display the one or more related attributes of each of the selected one or more groups, in a second view on the user interface, wherein the second view depicts attributes in an alternative manner than the first view; and program instructions to display, in the second view on the user interface, the one or more related attributes of each of the selected one or more groups, the second view comprising a virtual aspect view displaying the attributes with relation to components of the computer system, wherein the computer system is a server such that the virtual aspect view displays a server rack, the server in a position on the server rack, and the attributes in positions on the server, wherein each of the positions corresponds to respective physical locations in the server rack.

7. The computer program product of claim 6, wherein the first and the second view are displayed simultaneously in the user interface.

8. The computer program product of claim 6, wherein selection of the one or more groups to display is limited by an amount of attributes which can be simultaneously displayed in the first view on the user interface.

9. The computer program product of claim 6, wherein the plurality of attributes are selected from a group consisting of quantitative attributes and qualitative attributes.

10. The computer program product of claim 6, further comprising program instructions, stored on the one or more computer-readable storage media, to:

receive a selection of another one or more of the plurality of groups to display, based on a selection of another one or more corresponding descriptive titles;

remove, from the first view on the user interface, the attributes of each of the selected one or more groups; and display, in a first view on the user interface, the attributes of each of the selected other one or more groups.

11. A computer system for displaying attributes of a computer system, the computer system comprising:

one or more processors;

one or more computer-readable storage media;

program instructions stored on the one or more computer-readable storage media for execution by at least one of the one or more processors, the program instructions comprising:

program instructions to create a plurality of groups, from a plurality of attributes of a computer system, by tagging the plurality of attributes with the plurality of groups such that each attribute is associated with at least one group, and storing tag information for each of the attributes, wherein each instance of the tag information correlates to a connection of one of the attributes to one of the groups, wherein each of the plurality of groups consists of one or more related attributes, and at least one of the attributes is tagged with two or more of the groups;

program instructions to display, during creation of the plurality of groups, an indicator of a number of the attributes required to complete a current one of the groups;

program instructions to determine a descriptive title for each group of the plurality of groups, wherein the descriptive title for each group is determined based on at least one of a unit of measurement of the group of attributes, and a common subject implied by the attributes of the group;

program instructions to display, on a user interface, the descriptive title characterizing the one or more related attributes of each respective group of the plurality of groups;

program instructions to receive a selection of one or more of the plurality of groups to display, based on a selection of one or more corresponding descriptive titles of the displayed descriptive titles;

program instructions to display, in a first view on the user interface, the one or more related attributes of each of the selected one or more groups, the first view comprising a table view listing the attributes in a column and row format;

program instructions to receive a request to display the one or more related attributes of each of the selected one or more groups, in a second view on the user interface, wherein the second view depicts attributes in an alternative manner than the first view; and program instructions to display, in the second view on the user interface, the one or more related attributes of each of the selected one or more groups, the second view comprising a virtual aspect view displaying the attributes with relation to components of the computer system, wherein the computer system is a server such that the virtual aspect view displays a server rack, the server in a position on the server rack, and the attributes in positions on the server, wherein each of the positions corresponds to respective physical locations in the server rack.

12. The computer system of claim 11, wherein the first and the second view are displayed simultaneously in the user interface.

13. The computer system of claim 11, wherein selection of the one or more groups to display is limited by an amount of attributes which can be simultaneously displayed in the first view on the user interface.

14. The computer system of claim 11, wherein the plurality of attributes are selected from a group consisting of quantitative attributes and qualitative attributes.

15. The computer system of claim 11, further comprising program instructions, stored on the one or more computer-readable storage media, to:

receive a selection of another one or more of the plurality of groups to display, based on a selection of another one or more corresponding descriptive titles;

remove, from the first view on the user interface, the attributes of each of the selected one or more groups; and display, in the first view on the user interface, the attributes of each of the selected other one or more groups.

* * * * *